United States Patent Office 2,806,883
Patented Sept. 17, 1957

2,806,883
DURENE DIALDEHYDE AND ITS PREPARATION

Louis A. Mikeska and Donald F. Koenecke, Westfield, N. J., assignors to Esso Research and Engineering Company, a corporation of Delaware No Drawing. Application July 30, 1954,
Serial No. 446,974

5 Claims. (Cl. 260—599)

This invention relates to oxygen-containing aromatic compounds and to methods of synthesizing them. More particularly it relates to carbonyl compounds such as aldehydes and carboxylic acids obtainable by oxidation of aromatic alcohols such as benzyl alcohol, bis-hydroxymethyl benzene and the various higher homologues thereof. In its preferred embodiment the invention relates to tetramethyl terephthalyl dialdehyde and the preparation of this compound by oxidation of bis-hydroxymethyl durene.

Aromatic aldehydes and acids, and particularly the dibasic compounds of this sort, represent valuable chemicals which have many potential uses in the preparation of plastic, resinous or fiber-forming materials and as intermediates in various chemical syntheses such as the preparation of esters, amides, ethers and the like. However, as a rule, they are difficult to obtain.

It is the object of the present invention to provide new oxygen-containing aromatic compounds and to provide a new method for preparing monobasic or dibasic carbonyl compounds by oxidation of aryl carbinols or dicarbinols. Aromatic carbinols having a primary group are preferred and yield the corresponding aldehydes upon oxidation. However, aromatic compounds containing a secondary alcohol group may be treated similarly for the purpose of preparing ketones. One of the more specific objects is to provide an effective method for preparing oxygenated durene derivatives, notably tetramethyl terephthalyl dialdehyde.

The principal reagents used are aromatic carbinols or dicarbinols, that is, hydroxymethyl aromatics, such as benzyl alcohol, diphenyl carbinol, alpha-phenylethyl alcohol, styryl carbinol, bis-hydroxymethyl benzene, nuclearly alkylated benzyl alcohols having 1 to 5 alkyl substituents of 1 to 20 carbon atoms such as tolyl carbinol, dimethylphenyl carbinol, pentamethylphenyl carbinol, ethylphenyl carbinol, tetraethylphenyl carbinol, butylphenyl carbinol, oxo tridecylphenyl carbinol, bis-hydroxymethyl xylene, particularly para-bishydroxymethyl para-xylene, bis-hydroxymethyl durene, bis-hydroxymethyl isodurene, and the analogous derivatives of naphthalene and anthracene. In other words, the main reagent is a mono- or polynuclear aromatic compound having 1 to 2 hydroxyalkyl substituents of 1 to about 8 carbon atoms having the hydroxyl group attached to the carbon which is directly adjacent to the aromatic portion of the molecule. These compounds can be represented by the formula

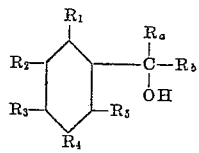

wherein the ring symbolizes a structure selected from the group consisting of benzene, naphthalene and anthracene; $R_a$ and $R_b$ are selected from the group consisting of hydrogen, aryl and alkyl radicals of 1 to 8 carbon atoms; one of said $R_1$ through $R_5$ radicals is selected from the group consisting of hydrogen, alkyl radicals of 1 to 20 and a carbinol radical

as just defined; and the other four of said $R_1$ through $R_5$ radicals are selected from the group consisting of hydrogen and alkyl radicals of 1 to 20 carbon atoms.

Bis-hydroxymethyl durene is particularly preferred because its compact but fully substituted nature and the para position of its two hydroxymethyl groups result in the formation of compounds which are especially valuable in the preparation of linear fiber-forming polymers. Somewhat similar results can also be obtained with other cyclic compounds having two carbinol groups in the para position such as bis-hydroxymethyl benzene, 2,5-bishydroxymethyl toluene, 1,4-dimethyl-2,5-bishydroxymethyl benzene, and so on. Furthermore, if the structure of the final product need not be linear, as in molding resins or insecticides, the two carbinol groups need not be in the para position with respect to each other. In such an event glycols derived from mixed xylenes or isodurene represent particularly useful raw materials.

Some of the foregoing cyclic alcohols are well known and others can be obtained from various sources. For instance, they can be obtained by conversion of the corresponding chloromethyl compound, which in turn can be advantageously prepared by the method described in a copending application of Mikeska et al., Serial No. 280,366, filed April 3, 1952, and now abandoned. In converting the chloromethyl compound to the corresponding carbinol, the former may be reacted, for example, with sodium acetate to form an ester and sodium chloride, and the ester can then be hydrolyzed in any convenient manner, e. g., by digestion with potassium hydroxide. One convenient method of making the hydroxymethyl compounds has been described, for example, by Rhoad and Flory, J. A. C. S., 72, 2214 (1950).

The essence of the invention lies in oxidizing the aromatic carbinol or glycol to the corresponding aldehyde or dialdehyde with the aid of a nitrated aromatic such as a nitrobenzene, nitrotoluene, nitroxylene, nitronaphthalene, etc. Mononitrated aromatics such as nitrobenzene and nitrotoluene are preferred since the polynitro compounds tend to give more complex byproducts and some of them, of course, are rather highly explosive.

In preparing the aldehyde, the appropriate alcohol is refluxed with a molecular excess of mononitro aromatic, e. g., 1.1 to 2.0 moles of nitrobenzene per mole of alcohol in the presence of a small amount, e. g., 0.1 to 0.5 mole, of a base catalyst such as sodium or potassium hydroxide, and preferably about 2 to 4 volumes (per volume of reaction mixture) of an inert, water immiscible entraining agent having a boiling point between about 50 and 150° C. such as xylene, toluene, benzene, saturated naphtha etc. An increase in the amount of base catalyst increases the oxidation rate, but also promotes the formation of a carboxylic acid by-product at the expense of aldehyde formation. Unless such acid is particularly desired, the optimum amount of catalyst is, therefore, arrived at as a compromise between a suitable reaction rate and aldehyde yield.

As the reaction mixture is refluxed at temperatures which may range between about 100° and 300° C., water is liberated and driven off. Collection of this water in a water trap at temperatures which may range between about 15° and 25° C. can therefore serve as a convenient index of the progress of the reaction. A small amount of soap is formed by reaction of the alkali with the acid produced in the reaction. On completion of the latter the soap may be filtered off.

The main oxidation reaction of an aromatic carbinol in forming the corresponding aldehyde is illustrated by following Equation 1:

(1)
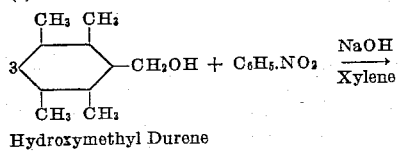 $+ C_6H_5.NO_2 \xrightarrow[\text{Xylene}]{\text{NaOH}}$

Hydroxymethyl Durene

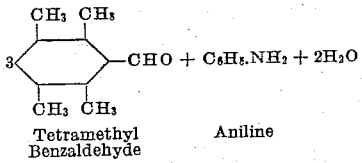 $+ C_6H_5.NH_2 + 2H_2O$

Tetramethyl Aniline
Benzaldehyde

As was indicated before, some of the alcohol is also converted to an acid, or rather a water-soluble alkali soap thereof, and some azobenzene is also formed.

The formation of an acid directly from the alcohol can be represented by Equation 2:

(2)
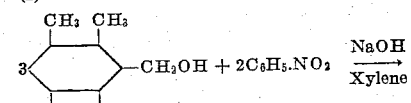 $+ 2C_6H_5.NO_2 \xrightarrow[\text{Xylene}]{\text{NaOH}}$

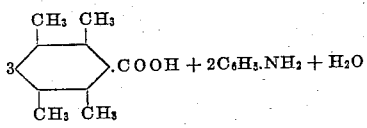 $.COOH + 2C_6H_5.NH_2 + H_2O$

The isolation of the aldehyde from the organic phase of the reaction mixture, or of the acid which is normally present as a sodium soap in the aqueous phase, depends on the particular alcohol used. In some cases, as with benzyl alcohol, the aldehyde produce can be recovered by distillation. In other cases, as with bis-(hydroxymethyl) durene, the aldehyde is conveniently recovered by fractional crystallizaion. In still others, as with bis-(hydroxymethyl) benzene, it may be desirable to convert the aldehyde into an oxime or a hydrazone in order to facilitate the isolation. The aniline and azobenzene formed in the reaction can also be recovered and form valuable by-products.

Dialdehydes can be similarly prepared from glycols as shown in Equation 3.

(3)
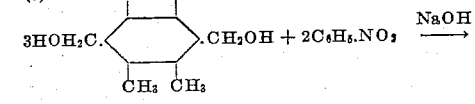 $.CH_2OH + 2C_6H_5.NO_2 \xrightarrow{\text{NaOH}}$

Bishydroxymethyl Durene

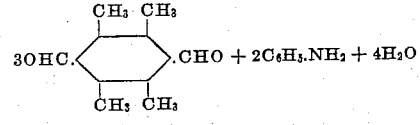 $.CHO + 2C_6H_5.NH_2 + 4H_2O$

The invention will now be further illustrated by a specific example. Unless otherwise indicated it will be understood that all proportions and percentages of materials are expressed on a weight basis.

*Preparation of bis-(hydroxymethyl) durene*

A four-necked flask was equipped with a reflux condenser, a stirrer, a thermometer and a charging port. It was charged with 472 g. of bis-(chloromethyl) durene, 412 g. sodium acetate and 2030 ml. of glacial acetic acid. The mixture was refluxed for 5 hours, then quenched with 2000 ml. of distilled water, filtered and washed thoroughly. The dry product, bis-(hydroxymethyl) durene diacetate, weighed 530 g., representing a 94% yield based on the theoretical. It was a white crystalline solid with a melting point of 181° C.

The preparation of the diacetate can be summarized by the following equation:

$ClCH_2.R.CH_2Cl + CH_3COONa \longrightarrow$
Bis(chloromethyl)
Durene $CH_3COOCH_2.R.CH_2OOCCH_3 + 2NaCl$
Diacetate The 530 g. of diacetate prepared above were next charged into a reaction flask identical to that used before. 266 g. of KOH were dissolved in 2380 ml. of absolute ethanol, then the solution was added to the reaction flask. The use of absolute alcohol is desirable as otherwise the hydrolysis does not proceed with any degree of efficiency. The mixture was refluxed for two hours to hydrolyze the ester. The mixture was then poured into 5 liters of distilled water and acidified with hydrochloric acid. Since bis-(hydroxymethyl) durene is essentially insoluble in alcohol, the product was precipitated as hydrolyzed. The precipitated dicarbinol product was filtered and thoroughly washed until the wash water was no longer acid to litmus. The filtered and dried product weighed 322 g., representing a 90% yield based on the theoretical input of 530 g. of diacetate.

The crude bis-(hydroxymethyl) durene had a melting range of 235–245° C. in a capillary tube. Recrystallization from hot dioxane or dimethyl formamide brought the melting point to 245–247° C. Bis-(hydroxymethyl) durene, also referred to as 2,3,5,6-tetramethyl phenylene-1,4-dicarbinol, is a white crystalline solid not readily soluble in ether, hydrocarbons, chlorinated hydrocarbons or ketones. It can be dissolved in hot dioxane or dimethyl formamide.

The preparation of the dicarbinol can be summarized by the following equation:

$CH_3COOCH_2.R.CH_2OOCCH_3 + 2KOH \longrightarrow$
Bis-(hydroxymethyl) durene
diacetate $HOCH_2.R.CH_2OH + 2CH_3COOK$
Bis-(hydroxymethyl)
durene

*Preparation of 2,3,5,6-tetramethyl terephthalyl dialdehyde*

The dialdehyde was prepared from the dicarbinol by oxidation. For this purpose, in one synthesis, a three-necked flask was equipped with a reflux condenser and water trap, a stirrer and an addition port. The flask was charged with 200 g. of bis-(hydroxymethyl) durene (M. W. 194), 200 g. of mononitrobenzene, 24 g. of pulverized technical grade sodium hydroxide and 600 cc. of xylene. The mixture was heated and refluxed at 145 to 148° C., and the water of reaction was trapped. After one and two hours, separate 12 g. portions of pulverized sodium hydroxide were added to speed up the oxidation.

After five hours of refluxing, 22 cc. of water had been collected, as against a theoretical amount of about 24 g. The reaction mixture was cooled to 85° C. and filtered. The insoluble fraction was found to contain 71 g. of unreacted bis-(hydroxymethyl) durene, and 7.0 g. of tarry acids. The filtrate was cooled and concentrated with successive crystallizations, yielding 83.8 g. of tetramethyl terephthalyl dialdehyde:

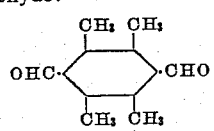

Steam distillation was then used to decrease the amounts of nitrobenzene, azobenzene and aniline in the mixture, and another subsequent crystallization yielded 15 g. more of the desired dialdehyde. Azobenzene and aniline were isolated as the by-products formed by the reduction of the nitrobenzene.

The final results were a 64.5% conversion of the bis-(hydroxymethyl) durene. Based on the isolated products, the selectivity to the dialdehyde was about 85%. The product, purified by repeated recrystallizations, had a melting point of 165° C.

In another synthesis the dialdehyde was prepared under somewhat different conditions. Using the same apparatus as just described, 200 g. of bis-(hydroxymethyl) durene were reacted with 150 g. of mononitrobenzene (a 77% excess) in the presence of 24 g. of pulverized technical sodium hydroxide, using 600 cc. of toluene as the solvent and entraining agent for the water of reaction. A further difference was that the bis-(hydroxymethyl) durene was washed with dilute sodium hydroxide and dried before using.

The mixture was heated and refluxed at 115–116° C. In two hours 32 cc. of water were collected and in 6.5 hours 51 cc. This is considerably in excess of the theoretical and was attributed to insufficient drying of the washed bis-(hydroxymethyl) durene.

The reaction mixture was cooled and filtered at 90° C. The insoluble material contained 22.2 g. of unreacted bis-(hydroxymethyl) durene and 25 g. of tarry acids. Successive crystallizations of the filtrate at 15° C., −15° C., and −25° C. gave a yield of 114.5 g. of tetramethyl terephthalyl dialdehyde melting from 158–162° C. Additional dialdehyde product remained dissolved in the residual liquor together with benzene, azobenzene and aniline, but no further effort was made to recover it. Parenthetically it may be noted that the dialdehyde is very soluble in aniline and the like.

The results of this oxidation indicated about 89% conversion of the bis-(hydroxymethyl) durene, with a selectivity of 82% to the tetramethyl terephthalyl dialdehyde based on the isolated oxidation products.

The main reaction is indicated by the following equation:

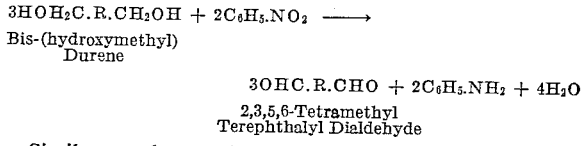

Similar results can be obtained when the invention is used, for instance, for making terephthalyl aldehyde by oxidation of bis-hydroxymethyl benzene, 2,5-dimethyl terephthalyl dialdehyde by oxidation of 2,5-dimethyl-p-xylene, p-methyl benzaldehyde from p-hydroxymethyl toluene and so forth.

The dialdehydes may be used as intermediates in the preparation of polyacetals, suitable for the preparation of synthetic fibers. Alternatively, the dialdehydes may be further oxidized to give the corresponding diacids, which in turn may be used to make resinous or fiber-forming polyesters as further described and claimed in copending application Serial No. 446,975, filed of even date herewith. The monobasic aldehydes may similarly be oxidized to the corresponding acids and esters which in turn can be used as synthetic lubricants, lubricating oil addition agents, plasticizers, insect repellants and the like.

Having described the general nature and specific examples of the invention, it will be understood that the scope and spirit of the invention is not necessarily restricted thereto except as more particularly pointed out in the appended claims.

What is claimed is:

1. 2,3,5,6-tetramethyl terephthalyl dialdehyde.

2. A process for oxidizing bis(hydroxymethyl) durene which comprises mixing said dicarbinol with about 1.1 to 2 mole equivalents of mononitrobenzene, also adding to the reaction mixture about 0.1 to 0.5 mole equivalents of pulverized sodium hydroxide and about 2 to 4 volumes of a water-immiscible inert entraining agent having a boiling point between about 50 and 150° C., heating the resulting mixture at a temperature in the range of about 100° to 300° C. and sufficient to vaporize the entrainer, withdrawing water vapor being liberated in the reaction, mechanically separating insoluble acid salts and unconverted feed from the reaction liquor, steam stripping nitrogen-containing compounds from said liquor, and cooling said liquor to separate crystals of an aromatic dialdehyde therefrom.

3. A process for making a dialdehyde which comprises mixing a 1,4-dihydroxymethylated benzene hydrocarbon with about 0.1 to 0.5 mole equivalents of an alkali metal hydroxide and about 1.1 to 2 mole equivalents of a mononitrated hydrocarbon of the class consisting of benzene, toluene, xylene and naphthalene, also adding to the reaction mixture about 2 to 4 volumes of a water-immiscible inert entraining agent having a boiling point between about 50° and 150° C., heating the resulting mixture at a temperature between about 100° and 300° C. and sufficient to vaporize the entrainer, withdrawing vaporized entrainer and water vapor being liberated in the reaction, and separating the resulting dialdehyde product from the mixture.

4. A process according to claim 3 wherein said dihydroxymethylated hydrocarbon is 2,3,5,6-tetramethyl phenylene-1,4-dicarbinol.

5. A process according to claim 4 wherein the entrainer is a benzene hydrocarbon having 1 to 2 methyl substituents and wherein the reaction mixture is heated at reflux temperature.

References Cited in the file of this patent

Beil. Org. Chem. Band VII, Erste & Zweites Erganzsingswerken (page 364 in Erste & page 607 in Zweites).

Wood et al.: J. Am. Chem. Soc. 72, 2992–3 (1950).

Unit Processes in Organic Synthesis, Groggins, 4th ed. McGraw-Hill, N. Y. 1952, 415–417 and 426 relied on.

Synthetic Org. Chem. Wagner, N. Y., Wiley & Sons, Inc. (1953), page 289 relied on.